(12) United States Patent
Zhao et al.

(10) Patent No.: US 12,046,945 B2
(45) Date of Patent: Jul. 23, 2024

(54) POWER SUPPLY APPARATUS AND POWER SUPPLY SYSTEM

(71) Applicant: Huawei Digital Power Technologies Co., Ltd., Shenzhen (CN)

(72) Inventors: Dongsheng Zhao, Xi'an (CN); Jianli Tong, Shenzhen (CN); Chuangpeng Li, Xi'an (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 196 days.

(21) Appl. No.: 17/582,962

(22) Filed: Jan. 24, 2022

(65) Prior Publication Data

US 2022/0149651 A1 May 12, 2022

Related U.S. Application Data

(63) Continuation of application No. PCT/CN2020/120482, filed on Oct. 12, 2020.

(30) Foreign Application Priority Data

Dec. 19, 2019 (CN) .......................... 201911320318.7

(51) Int. Cl.
*H02J 9/06* (2006.01)
*G06F 1/26* (2006.01)
(Continued)

(52) U.S. Cl.
CPC .............. *H02J 9/061* (2013.01); *G06F 1/263* (2013.01); *H02J 1/084* (2020.01); *H02J 9/062* (2013.01);
(Continued)

(58) Field of Classification Search
CPC .... H02J 9/061; H02J 9/062; H02J 9/06; H02J 1/084; H02J 1/102; H02J 2310/16; H02J 9/068; G06F 1/263; G06F 1/30
See application file for complete search history.

(56) References Cited

U.S. PATENT DOCUMENTS 9,373,977 B1 * 6/2016 Kim ...................... H02J 7/0068
10,432,108 B2   10/2019 Kawai
(Continued)

FOREIGN PATENT DOCUMENTS

CN   102163871 A   8/2011
CN   202309204 U   7/2012
(Continued)

OTHER PUBLICATIONS

Wikipedia, "Lithium Iron Phosphate Battery", retrieved from https://en.wikipedia.org/wiki/Lithium_iron_phosphate_battery, archived on Jan. 3, 2018 (Year: 2018).*

*Primary Examiner* — Ryan Johnson
(74) *Attorney, Agent, or Firm* — Leydig, Voit & Mayer, Ltd.

(57) ABSTRACT

A power supply apparatus includes a switching circuit including a switcher, a first input terminal, a second input terminal, and an output terminal, the first input terminal is configured to receive a first voltage provided by a first power supply, the second input terminal is configured to receive a second voltage provided by a second power supply, and the switcher is configured to control the output terminal to be connected to the first input terminal or control the output terminal to be connected to the second input terminal; and a converting circuit including an input terminal connected to the output terminal of the switching circuit, an output terminal connected to an electrical device, and the converting circuit is configured to receive the first or the second voltage, convert the received first second voltage into a third (Continued)

voltage, and output the third voltage through the output terminal of the converting circuit.

13 Claims, 3 Drawing Sheets

(51) Int. Cl.
  *H02J 1/08* (2006.01)
  *H02M 3/335* (2006.01)
(52) U.S. Cl.
  CPC ......... *H02J 9/068* (2020.01); *H02M 3/33573* (2021.05); *H02J 2310/16* (2020.01)

(56) References Cited

U.S. PATENT DOCUMENTS

| | | |
|---|---|---|
| 2009/0027930 A1 | 1/2009 | Usui |
| 2015/0244207 A1 | 8/2015 | Narita |
| 2016/0049822 A1* | 2/2016 | Lee .......................... G06F 1/28 |
| | | 307/66 |
| 2019/0006880 A1 | 1/2019 | Wang |
| 2019/0181773 A1* | 6/2019 | Kawai ....................... H02J 3/38 |

FOREIGN PATENT DOCUMENTS

| | | |
|---|---|---|
| CN | 102957198 A | 3/2013 |
| CN | 104092236 A | 10/2014 |
| CN | 104883054 A | 9/2015 |
| CN | 105790423 A | 7/2016 |
| CN | 205791773 U | 12/2016 |
| CN | 106410955 A | 2/2017 |
| CN | 106532910 A | 3/2017 |
| CN | 107046290 A | 8/2017 |
| CN | 109066964 A | 12/2018 |
| CN | 109661766 A | 4/2019 |
| CN | 109861560 A | 6/2019 |
| CN | 209435108 U | 9/2019 |
| CN | 111106667 A | 5/2020 |
| CN | 111371169 A | 7/2020 |
| CN | 111463894 A | 7/2020 |
| JP | 2002034177 A | 1/2002 |
| WO | 2018032981 A1 | 2/2018 |

* cited by examiner

POWER SUPPLY APPARATUS AND POWER SUPPLY SYSTEM

CROSS-REFERENCE TO RELATED APPLICATIONS

This application is a continuation of International Application No. PCT/CN2020/120482, filed on Oct. 12, 2020, which claims priority to Chinese Patent Application No. 201911320318.7, filed on Dec. 19, 2019. The disclosures of the aforementioned applications are hereby incorporated by reference in their entireties.

TECHNICAL FIELD

This application relates to the field of power electronics technologies, and in particular, to a power supply apparatus and a power supply system.

BACKGROUND

A distributed data center equipment room requires quite high power supply reliability. Each electrical device usually requires a configuration with two power supplies for power supply, and the two power supplies supply power mainly by using uninterruptible power supplies (UPS) or high-voltage direct currents (HVDCs).

A typical power supply architecture of the distributed data center includes two UPSs, two HVDCs, or a mix of a UPS and an HVDC. For loads in the data center equipment room, each UPS or HVDC is configured with one power module for each load to be connected to the load, to implement mutual backup of the power modules. It can be learned from the foregoing description that, in an application scenario for a high power supply requirement in a conventional technology, the two power supplies are separately configured with one power module before reaching a load, which is configured to convert a voltage output by the power supply into a supply voltage of the load. These power modules increase a footprint occupied by a power supply apparatus, system costs, and system maintenance costs. Therefore, an existing power supply manner of the distributed data center needs to be further improved.

SUMMARY

Embodiments of this application provide a power supply apparatus and a power supply system, to reduce a volume of the power supply apparatus and power supply costs.

According to a first aspect, an embodiment of this application provides a power module, and the power module includes a switching circuit and a converting circuit. The switching circuit includes a switcher, a first input terminal, a second input terminal, and an output terminal. The first input terminal of the switching circuit is configured to receive a first voltage provided by a first power supply, the second input terminal of the switching circuit is configured to receive a second voltage provided by a second power supply, and the switcher is configured to control the output terminal of the switching circuit to be connected to the first input terminal or control the output terminal of the switching circuit to be connected to the second input terminal. The converting circuit includes an input terminal and an output terminal. The input terminal of the converting circuit is connected to the output terminal of the switching circuit, the output terminal of the converting circuit is connected to an electrical device, and the converting circuit is configured to receive the first voltage or the second voltage, convert the received first voltage or the received second voltage into a third voltage, and output the third voltage through the output terminal of the converting circuit.

A voltage value of the first voltage may be equal to a voltage value of the second voltage. For example, the first input terminal of the switching circuit receives the first voltage, the second input terminal of the switching circuit receives the second voltage, and the output terminal of the switching circuit is directly connected to the input terminal of the converting circuit. When the output terminal of the switching circuit is connected to the first input terminal of the switching circuit or the second input terminal of the switching circuit, voltage values of the voltages output through the output terminal of the switching circuit are both equal, and the converting circuit converts the first voltage or the second voltage output by the switching circuit into the third voltage (a supply voltage of the electrical device) and then supplies the third voltage to the electrical device.

By using the power supply apparatus provided in the first aspect, the first power supply or the second power supply that supplies power to the electrical device may be selected by using the switching circuit, and the first voltage output by the first power supply or the second voltage output by the second power supply is converted into the supply voltage of the electrical device by using one converting circuit. Therefore, when two power supplies are used to supply power to the electrical device, only one power supply apparatus is required to convert two alternating currents into the supply voltage of the electrical device, and supplies power to the electrical device, thereby reducing costs and a volume of the power supply apparatus.

In an embodiment, the converting circuit includes a converter. An input terminal of the converter is the input terminal of the converting circuit, and an output terminal of the converter is the output terminal of the converting circuit. When the first voltage and the second voltage are direct current voltages, the converter is configured to: when a voltage value of the received first voltage is greater than a first preset voltage threshold or a voltage value of the received second voltage is greater than the first preset voltage threshold, convert the first voltage or the second voltage into the third voltage, and output the third voltage through the output terminal of the converter; or, when the first voltage and the second voltage are alternating current voltages, the converter is configured to: when a valid value of the received first voltage is greater than the first preset voltage threshold or a valid value of the second voltage is greater than the first preset voltage threshold, convert the first voltage or the second voltage into the third voltage, and output the third voltage through the output terminal of the converter.

By using the power supply apparatus provided in the first aspect, the power supply apparatus may be directly connected to alternating current power supplies such as a mains supply and an electric generator, or may be connected to an output terminal of a UPS, and convert, by using the converter, the received first voltage or the received second voltage into a direct current supply voltage required by the electrical device, to supply power to the electrical device.

In an embodiment, the converting circuit further includes a first energy storage device. The first energy storage device is connected to the output terminal of the converter; and the first energy storage device may be configured to store a part of the third voltage output by the converter when a voltage value of the third voltage is greater than a second preset voltage threshold, and output the stored voltage through the output terminal of the converter when a voltage value of the third voltage is less than or equal to the second preset voltage threshold.

By using the power supply apparatus provided in the first aspect, when the voltage value of the third voltage is greater than the second preset voltage threshold, it may be determined that the first power supply or the second power supply works normally. In this case, the converting circuit may normally output the third voltage to supply power to the electrical device. When the voltage value of the third voltage is less than or equal to the second voltage threshold, it may be determined that the first power supply and the second power supply are faulty, and the voltage output through the output terminal of the converting circuit cannot supply power to the electrical device. In this case, the voltage stored in the first energy storage device may be used to supply power to the electrical device for a short term, to implement data backup of the electrical device and wait for the first power supply or the second power supply to resume normal.

In an embodiment, the power supply apparatus provided in the embodiment of the first aspect further includes a second energy storage device independent of the converting circuit; and the second energy storage device is connected to the output terminal of the converting circuit. The second energy storage device may be configured to store a part of the third voltage output by the converter when a voltage value of the third voltage is greater than a third preset voltage threshold, and output the stored voltage through the output terminal of the converter when a voltage value of the third voltage is less than or equal to the third preset voltage threshold.

By using the power supply apparatus provided in the first aspect, when the voltage value of the third voltage is greater than the third preset voltage threshold, it may be determined that the first power supply or the second power supply works normally. In this case, the converting circuit may normally output the third voltage to supply power to the electrical device. When the voltage value of the third voltage is less than or equal to the second voltage threshold, it may be determined that the first power supply and the second power supply are faulty, and the third voltage output through the output terminal of the converting circuit cannot supply power to the electrical device. In this case, the voltage stored in the second energy storage device may be used to supply power to the electrical device for a short term, to implement data backup of the electrical device and wait for the first power supply or the second power supply to resume normal.

In an embodiment, the converting circuit further includes a first controller. The first controller may be configured to: control the converter to convert the first voltage or the second voltage into the third voltage, and control the first energy storage device to output the stored voltage through the output terminal of the converter when the voltage value of the third voltage is less than or equal to the second preset voltage threshold.

By using the power supply apparatus provided in the first aspect, under control of the first controller, when the first power supply or the second power supply is normal, the first power supply or the second power supply may be used to supply power to the electrical device; and when the first power supply and the second power supply are faulty, the first energy storage device is used to supply power to the electrical device.

In an embodiment, the power supply apparatus provided in the embodiment of the first aspect of this application further includes a second controller. The second controller may be configured to: control the converter to convert the first voltage or the second voltage into the third voltage, and control the second energy storage device to output the stored voltage through the output terminal of the converter when the voltage value of the third voltage is less than or equal to the third preset voltage threshold.

By using the power supply apparatus provided in the first aspect, under control of the second controller, when the first power supply or the second power supply is normal, the first power supply or the second power supply may be used to supply power to the electrical device, and when the first power supply and the second power supply are faulty, the second energy storage device is used to supply power to the electrical device.

In an embodiment, the first energy storage device may include any one of the following: a lead carbon battery, a lithium iron phosphate battery, a ternary lithium battery, a sodium sulfur battery, a graphene battery, a capacitor, or a flow battery.

In an embodiment, the second energy storage device may include any one of the following: a lead carbon battery, a lithium iron phosphate battery, a ternary lithium battery, a sodium sulfur battery, a graphene battery, a capacitor, or a flow battery.

In an embodiment, the switcher may include a power semiconductor device or a mechanical switching device.

According to a second aspect, an embodiment of this application further provides a power supply system. The power supply system includes a first power supply, a second power supply, and a plurality of power supply apparatuses provided in the first aspect and any one of the possible designs of the first aspect.

Optionally, the first power supply is connected to a first input terminal of each of the plurality of power supply apparatuses, and the first power supply is configured to supply power to the plurality of power supply apparatuses.

Optionally, the second power supply is connected to a second input terminal of each of the plurality of power supply apparatuses, and the second power supply is configured to supply power to the plurality of power supply apparatuses.

Optionally, the plurality of power supply apparatuses are connected to a plurality of electrical devices in a one-to-one correspondence, and the plurality of power supply apparatuses are configured to supply power to the plurality of electrical devices.

DESCRIPTION OF EMBODIMENTS

The following further describes the embodiments of this application in detail with reference to the accompanying drawings.

Figure 1:
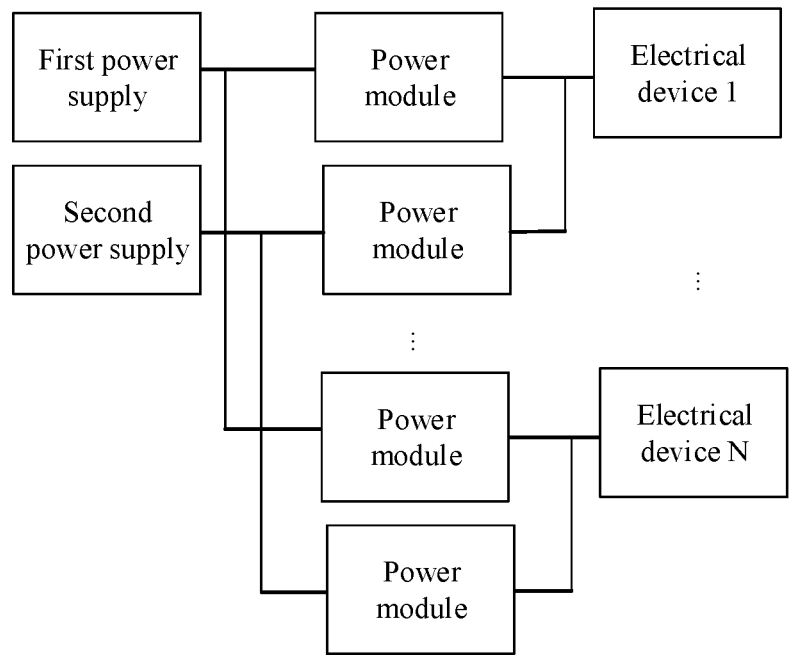
FIG. 1 is a schematic diagram of a structure of a power supply system.

First, a scenario to which an embodiment of this application may be applied is described. This embodiment of this application may be applied to a power supply architecture that supplies power to a load, such as a distributed data center system. FIG. 1 shows a possible power supply structure of an existing distributed data center system. As shown in FIG. 1, the power supply structure includes a plurality of power modules, which are configured to supply power to a plurality of electrical devices. For example, each electrical device is configured with two power modules. The two power modules are separately connected to one power supply, and are configured to convert a voltage output by the connected power supply into a supply voltage of the electrical device, and then provide the supply voltage to the connected electrical device. Therefore, when one of the two power supplies is faulty, the electrical device may alternatively obtain the supply voltage by using the power module connected to the other power supply, and work normally, to improve power supply reliability.

Although the power supply structure shown in FIG. 1 can be implemented to supply power to the electrical device, in a power supply process, each electrical device in FIG. 1 is configured with two power modules to implement power supply with two power supplies. Therefore, utilization of voltages output by the two power supplies is low, and the two power modules need to occupy a large volume in a power supply site, thereby causing problems such as high system costs and high system maintenance costs.

Therefore, the foregoing power supply apparatus has problems of a large volume and high costs. Embodiments of this application provide a power supply apparatus and a power supply system, to reduce a volume of the power supply apparatus and power supply costs.

It should be noted that "a plurality of" used in this application means two or more. The term "connection" used in this application describes a connection relationship between two objects, and may represent two types of connection relationships. For example, A and B are connected, which may represent two cases: A and B are directly connected, and A is connected to B by using C.

In addition, it should be understood that, in the description of this application, words such as "first" and "second" are merely used to distinguish the description, and cannot be understood as indicating or implying relative importance, or as indicating or implying sequence.

Figure 2:
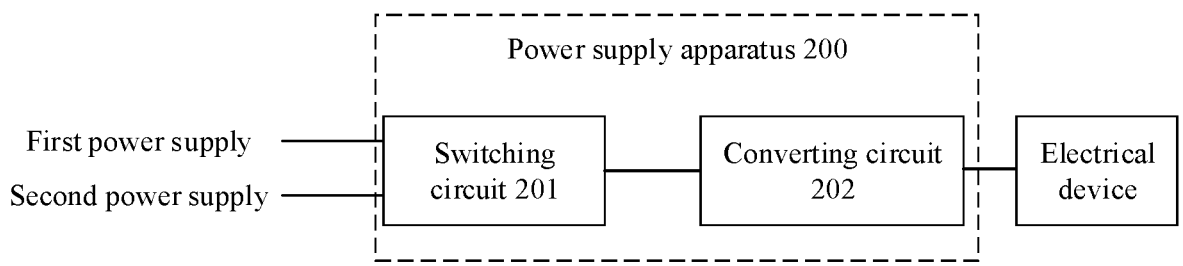
FIG. 2 is a schematic diagram 1 of a structure of a power supply apparatus according to an embodiment of this application.

FIG. 2 is a schematic diagram of a structure of a power supply apparatus according to an embodiment of this application. The power supply apparatus 200 includes a switching circuit 201 and a converting circuit 202. The switching circuit 201 includes a switcher, a first input terminal, a second input terminal, and an output terminal. The first input terminal of the switching circuit 201 is configured to receive a first voltage provided by a first power supply, the second input terminal of the switching circuit 201 is configured to receive a second voltage provided by a second power supply, and the switcher is configured to control the output terminal of the switching circuit 201 to be connected to the first input terminal or control the output terminal of the switching circuit 201 to be connected to the second input terminal. The converting circuit 202 includes an input terminal and an output terminal. The input terminal of the converting circuit 202 is connected to the output terminal of the switching circuit 201, the output terminal of the converting circuit 202 is configured to be connected to an electrical device, and the converting circuit 202 is configured to receive the first voltage or the second voltage, convert the received first voltage or the received second voltage into a third voltage, and output the third voltage to the electrical device through the output terminal of the converting circuit 202. The first power supply and the second power supply may include alternating current power supplies such as a mains supply and an electric generator, and the first power supply and the second power supply may further include a UPS. This is not specifically limited herein in this application.

A voltage value of the first voltage may be equal to a voltage value of the second voltage. Specifically, the first input terminal of the switching circuit 201 is configured to receive the first voltage, and the second input terminal of the switching circuit 201 is configured to receive the second voltage. The output terminal of the switching circuit 201 is directly connected to the input terminal of the converting circuit 202. When the output terminal of the switching circuit 201 is connected to the first input terminal of the switching circuit 201 or the second input terminal of the switching circuit 201, voltage values of the voltages output through the output terminal of the switching circuit 201 are both equal, and the converting circuit 202 converts the first voltage or the second voltage output by the switching circuit 201 into the third voltage and then outputs the third voltage to the electrical device, to supply power to the electrical device.

Still further, positive and negative directions of the first voltage and the second voltage may be the same. That the positive and negative directions of the first voltage and the second voltage are the same may specifically mean that: If the output terminal of the switching circuit 201 is connected to the first input terminal of the switching circuit 201, a terminal of the first input terminal that receives a high level is connected to a terminal of the output terminal that outputs the high level, and a terminal of the first input terminal that receives a low level is connected to a terminal of the output terminal that outputs the low level; if the output terminal of the switching circuit 201 is connected to the second input terminal of the switching circuit 201, a terminal of the second input terminal that receives a high level is connected to a terminal of the output terminal that outputs the high level, and a terminal of the second input terminal that receives a low level is connected to a terminal of the output terminal that outputs the low level.

In actual application, a distributed data center system is used as an example. The power supply apparatus 200 may be fixed in a power distribution cabinet. A plurality of fixed interfaces are disposed in the power distribution cabinet, and the electrical device may be connected to the power supply apparatus 200 by using the fixed interfaces in the power distribution cabinet. For example, a power plug of a device such as a mobile phone, a navigation device, a television, or a notebook computer may be directly plugged into the fixed interface so that the power supply apparatus 200 supplies power to the device such as the mobile phone or the notebook computer. In another implementation, the power supply apparatus 200 may alternatively be disposed in a flexible and detachable manner. The power supply apparatus 200 is fixed to the electrical device, and the power supply apparatus 200 may be connected to the electrical device by using a wire. In this case, the power supply apparatus 200 and the electrical device may be considered as a whole apparatus.

In an embodiment, the converting circuit 202 may include components such as a switch transistor, a diode, an inductor, and a capacitor. A working state of the converting circuit 202 may be implemented by adjusting working states of these components (for example, the switch transistor).

The following describes specific structures of a switching circuit 201 and a converting circuit 202 in the power supply apparatus 200.

I. Switching Circuit 201

The switching circuit 201 includes a switcher, a first input terminal, a second input terminal, and an output terminal. The first input terminal of the switching circuit 201 is configured to receive a first alternating current provided by a first power supply, the second input terminal of the switching circuit 201 is configured to receive a second alternating current provided by a second power supply, and the switcher is configured to control the output terminal of the switching circuit 201 to be connected to the first input terminal or control the output terminal of the switching circuit 201 to be connected to the second input terminal. The switcher may include a power semiconductor device or a mechanical switching device.

The following provides a specific structure of the switcher.

In an embodiment, the switcher may include a first switch and a second switch. A first terminal of the first switch is connected to the first input terminal of the switching circuit 201, a first terminal of the second switch is connected to the second input terminal of the switching circuit 201, and both a second terminal of the first switch and a second terminal of the second switch are connected to the output terminal of the switching circuit 201.

It should be understood that the first switch and the second switch may be closed or disconnected by directly controlling the output terminal of the switching circuit 201 to output a first alternating current or a second alternating current. When at least one of the first power supply and the second power supply is normal, the output terminal of the switching circuit 201 outputs a first voltage or a second voltage, that is, only one of the power supplies is required to provide electrical energy to the converting circuit 202. For example, when the first switch is closed and the first power supply is not faulty, the output terminal of the switching circuit 201 outputs a first voltage. When the first power supply is faulty, the first switch may be disconnected and the second switch may be closed. In this case, the output terminal of the switching circuit 201 outputs a second voltage. When the power supply apparatus 200 is used to supply power to an electrical device, only one power supply is required at a same moment to supply power to the electrical device. Therefore, electrical energy utilization of the first voltage output by the first power supply and the second voltage output by the second power supply can be improved. The first switch and the second switch may be coupled switches.

In another embodiment, the switcher may include a double-pole double-throw switch. When the double-pole double-throw switch is in a first position, the first input terminal of the switching circuit 201 is connected to the output terminal of the switching circuit 201. When the double-pole double-throw switch is in a second position, the second input terminal of the switching circuit 201 is connected to the output terminal of the switching circuit 201.

For ease of understanding, the following provides a specific example of the switching circuit 201.

Figure 3:
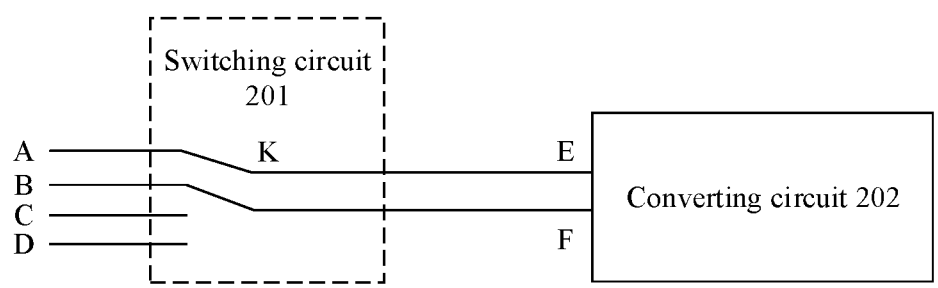
FIG. 3 is a schematic diagram of a structure of a switching circuit according to an embodiment of this application.

FIG. 3 is a schematic diagram of a structure of a switching circuit 201 according to an embodiment of this application. In FIG. 3, K may be considered as a double-pole double-throw switch, and K forms a switcher. A may be considered as a first terminal point of a first input terminal of the switching circuit 201, B may be considered as a second terminal point of the first input terminal of the switching circuit 201, and A and B are respectively connected to two output terminals of a first power supply. C may be considered as a first terminal point of a second input terminal of the switching circuit 201, D may be considered as a second terminal point of the second input terminal of the switching circuit 201, and C and D are respectively connected to two output terminals of a second power supply. E may be considered as a first terminal point of an output terminal of the switching circuit 201, F may be considered as a second terminal point of the output terminal of the switching circuit 201, and E and F are connected to two terminal points of an input terminal of a converting circuit 202.

When the switching circuit 201 shown in FIG. 3 is used to supply power to an electrical device, A and B are used as first single-phase input terminals to receive a first voltage provided by the first power supply, C and D are used as second single-phase input terminals to receive a second voltage provided by the second power supply, and E and F are used as output terminals to output a third voltage. Energy is transmitted from left to right, and one voltage of the two single-phase alternating current voltages or direct current voltages input from the left side is output.

When the switching circuit 201 shown in FIG. 3 is used to supply power to the electrical device, and when the double-pole double-throw switch K is in a first position, E and F are respectively connected to A and B. In this case, the first voltage output by the first power supply is output to the converting circuit 202 by using K. When the double-pole double-throw switch K is in a second position, E and F are respectively connected to C and D. In this case, the second voltage output by the second power supply is output to the converting circuit 202 by using K.

Certainly, the foregoing description of the structure of the switching circuit 201 is only an example. In actual application, the switching circuit 201 may alternatively use another structure, for example, a structure of two contactors. This is not described in detail herein in this application.

II. Converting Circuit 202

The converting circuit 202 includes an input terminal and an output terminal. The input terminal of the converting circuit 202 is connected to the output terminal of the switching circuit 201, and the output terminal of the converting circuit 202 is configured to be connected to the electrical device. The following provides a specific structure of the converting circuit 202.

The converting circuit 202 includes a converter. An input terminal of the converter is the input terminal of the converting circuit 202, and an output terminal of the converter is the output terminal of the converting circuit 202.

Functions of the converter are set as follows: When the first voltage and the second voltage are direct current voltages, the converter is configured to: when a voltage value of the received first voltage is greater than a first preset voltage threshold or a voltage value of the received second voltage is greater than the first preset voltage threshold, convert the first voltage or the second voltage into a third voltage, and output the third voltage through the output terminal of the converter; or, when the first voltage and the second voltage are alternating current voltages, the converter is configured to: when a valid value of the received first voltage is greater than the first preset voltage threshold or a valid value of the second voltage is greater than the first preset voltage threshold, convert the first voltage or the second voltage into the third voltage, and output the third voltage through the output terminal of the converter. For example, the first preset voltage threshold is 5 V, and certainly may alternatively be set to 0 V. This is not described in detail herein in this application.

In an embodiment, the converting circuit 202 may further include a first energy storage device. The first energy storage device is connected to the output terminal of the converter; and the first energy storage device may be configured to store a part of the third voltage output by the converter when a voltage value of the third voltage is greater than a second preset voltage threshold, and output the stored direct current to the electrical device through the output terminal of the converter when a voltage value of the third voltage is less than or equal to the second preset voltage threshold. The first energy storage device may include any one of the following: a lead carbon battery, a lithium iron phosphate battery, a ternary lithium battery, a sodium sulfur battery, a graphene battery, a capacitor, or a flow battery. The second preset voltage threshold may be 5 V, and certainly may alternatively be set to 0 V. This is not described in detail herein in this application.

In another embodiment, the output terminal of the converting circuit 202 may be connected to a second energy storage device, and the second energy storage device is independent of the converting circuit 202. The second energy storage device is connected to the output terminal of the converting circuit 202. The second energy storage device may be configured to store a part of a direct current output by the converting circuit 202 when a voltage value of the third voltage is greater than a third preset voltage threshold, and output the stored direct current to the electrical device through the output terminal of the converting circuit 202 when a voltage value of the third voltage is less than or equal to the third preset voltage threshold. The third preset voltage threshold may be 5 V, and certainly may alternatively be set to 0 V. This is not described in detail herein in this application.

It should be understood that, to ensure power supply reliability when the first power supply and the second power supply are faulty, the second energy storage device may further be connected to an external direct current power supply, to meet an electrical energy requirement of the electrical device when the first power supply and the second power supply are faulty for a long time. The following provides a specific structure of the converter.

The converter may include a first H-bridge rectifier circuit, an isolation transformer, and a second H-bridge rectifier circuit. A primary-side winding of the isolation transformer is coupled to the first H-bridge rectifier circuit, and a secondary-side winding of the isolation transformer is coupled to the second H-bridge rectifier circuit.

The first H-bridge rectifier circuit may include a switch transistor, and is configured to adjust the first voltage and the second voltage. The second H-bridge rectifier circuit may also include a switch transistor, and is configured to rectify the first voltage and the second voltage that have been adjusted and to output the third voltage.

In this embodiment of this application, the converter may use an existing structure, which includes two H-bridge rectifier circuits and one isolation transformer. An intermediate node of a first bridge arm of the first H-bridge rectifier circuit and an intermediate node of a second bridge arm of the first H-bridge rectifier circuit may be used as two terminal points of the input terminal of the converting circuit 202, and connected to two terminal points of the output terminal of the switching circuit 201. An intermediate node of a first bridge arm of the second H-bridge rectifier circuit and an intermediate node of a second bridge arm of the second H-bridge rectifier circuit may be used as two terminal points of the output terminal of the converting circuit 202, and configured to be connected to a positive line and a negative line of the electrical device (in this case, a voltage between the two terminal points of the input terminal of the converting circuit 202 is the first voltage or the second voltage, and a voltage between the two terminal points of the output terminal of the converting circuit 202 is the third voltage).

By using the foregoing converter, voltage regulation and rectification processing may be performed on the first voltage and the second voltage, and isolation between the power supply and the electrical device may be further implemented.

It should be understood that, to improve efficiency of conversion into a direct current by the converting circuit 202, the converting circuit 202 further includes an inductor. The inductor and the first H-bridge rectifier circuit constitute a power factor correction (power factor correction, PFC) circuit, where the inductor is bridged between the first H-bridge rectifier circuit and the input terminal of the converting circuit 202.

For ease of understanding, the following provides two specific examples of the converting circuit 202.

Figure 4:
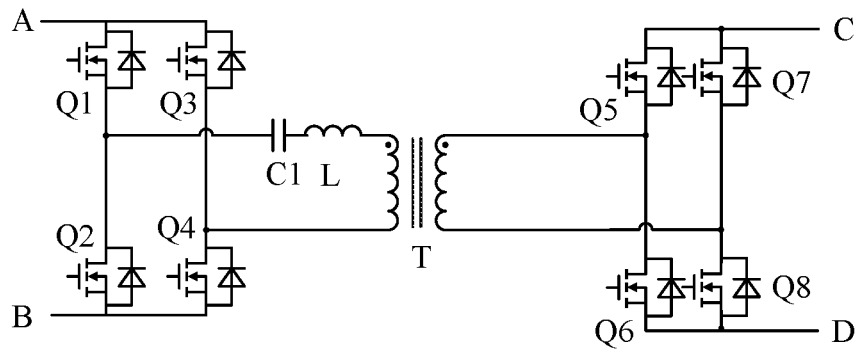
FIG. 4 is a schematic diagram 1 of a structure of a converting circuit according to an embodiment of this application.

FIG. 4 is a schematic diagram of a structure of a converting circuit 202 according to an embodiment of this application. In FIG. 4, A and B are used as input terminals, C and D are used as output terminals, MOS transistors Q1, Q2, Q3, and Q4 constitute a first H-bridge rectifier circuit, MOS transistors Q5, Q6, Q7, and Q8 constitute a second H-bridge rectifier circuit, and L, C1, and T constitute an isolation transformer. L and T may be discrete devices, or may be integrated in a magnetic integration manner.

When a power supply apparatus 200 is used to supply power to an electrical device, A and B are used as input terminals and are configured to receive a first voltage or a second voltage output by a switching circuit 201, and C and D are used as output terminals and are configured to be connected to the electrical device and output a third voltage, to supply power to the electrical device.

When the converting circuit 202 shown in FIG. 4 is used to supply power to the electrical device, and when at least one of a first power supply and a second power supply is normal, A and B are used as input terminals, and C and D are used as output terminals. Energy is transmitted from left to right, and a single-phase alternating current voltage or direct current voltage input from the left side is converted into a supply voltage of the electrical device, and then is output to the electrical device. When both the first power supply and the second power supply are faulty, a second energy storage device disposed independently of the converting circuit 202 in the power supply apparatus 200 is used as an input terminal, and C and D are used as output terminals to output the direct current stored in the second energy storage device to the electrical device.

For example, when the converting circuit 202 shown in FIG. 4 is used to supply power to the electrical device, the converting circuit 202 may further include a second controller. The second controller is connected to a switch transistor in the converting circuit 202 and may be configured to: control a converter to convert the first voltage or the second voltage into the third voltage, and control the second energy storage device to output the stored direct current through an output terminal of the converter when a voltage value of the third voltage is less than or equal to a third preset voltage threshold.

For example, if a switch transistor in each circuit of the converting circuit 202 is a metal oxide semiconductor (MOS) transistor, the second controller may be connected to a gate of the MOS transistor, so that the power supply apparatus 200 can supply power to the electrical device by controlling on/off of the MOS transistor. If a switch transistor in each circuit of the converting circuit 202 is a bipolar junction transistor (BJT), the second controller may be connected to a base of the BJT, so that the power supply apparatus 200 can supply power to the electrical device by controlling on/off of the BJT.

In an embodiment, if the second controller may further be connected to the switcher, the switching circuit 201 is controlled to output the first voltage or the second voltage by controlling on/off of the switch transistor included in the switching circuit 201.

During specific implementation, the second controller may be any one of a micro controller unit (MCU), a central processing unit (CPU), or a digital signal processor (DSP). Certainly, a specific form of the second controller is not limited to the foregoing example.

Figure 5:
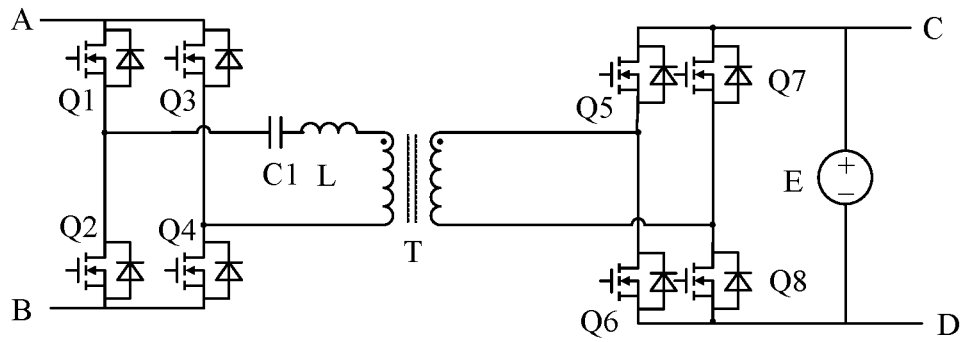
FIG. 5 is a schematic diagram 2 of a structure of a converting circuit according to an embodiment of this application.

FIG. 5 is a schematic diagram of a structure of another converting circuit 202 according to an embodiment of this application. In FIG. 5, A and B are used as input terminals, C and D are used as output terminals, MOS transistors Q1, Q2, Q3, and Q4 constitute a first H-bridge rectifier circuit, MOS transistors Q5, Q6, Q7, and Q8 constitute a second H-bridge rectifier circuit, L, C1, and T constitute an isolation transformer, and E may be considered as a first energy storage device. L and T may be discrete devices, or may be integrated in a magnetic integration manner.

When a power supply apparatus 200 is used to supply power to an electrical device, A and B are used as input terminals and are configured to receive a first voltage or a second voltage output by a switching circuit 201, and C and D are used as output terminals and are configured to be connected to the electrical device and output a third voltage, to supply power to the electrical device.

When the converting circuit 202 shown in FIG. 5 is used to supply power to the electrical device, and when at least one of a first power supply and a second power supply is normal, A and B are used as input terminals, and C and D are used as output terminals. Energy is transmitted from left to right, and a single-phase alternating current voltage or direct current voltage input from the left side is converted into a supply voltage of the electrical device, and then is output to the electrical device. When both the first power supply and the second power supply are faulty, E is used as an input terminal, and C and D are used as output terminals to output the direct current stored in E to the electrical device.

In addition, the converting circuit 202 uses the foregoing structure. In addition to implementing voltage conversion for converting an alternating current into a direct current, a high power factor and a low current harmonic may further be obtained by controlling on/off of a switch transistor in the converting circuit 202.

For example, when the converting circuit 202 shown in FIG. 5 is used to supply power to the electrical device, the converting circuit 202 may further include a first controller.

The first controller is connected to the switch transistor in the converting circuit 202 and may be configured to: control a converter to convert the first voltage or the second voltage into the third voltage, and control the first energy storage device to output the stored direct current through an output terminal of the converter when a voltage value of the third voltage is less than or equal to a second preset voltage threshold.

For example, if a switch transistor in each circuit of the converting circuit 202 is a MOS transistor, the first controller may be connected to a gate of the MOS transistor, so that the power supply apparatus 200 can supply power to the electrical device by controlling on/off of the MOS transistor. If a switch transistor in each circuit of the converting circuit 202 is BJT, the first controller may be connected to a base of the BJT, so that the power supply apparatus 200 can supply power to the electrical device by controlling on/off of the BJT.

In this application, the converting circuit 202 may further include the first controller. The first controller is configured to store a part of the direct current output by the converter when a voltage value of the third voltage is greater than the second preset voltage threshold, and output the stored direct current through the output terminal of the converter when a voltage value of the third voltage is less than or equal to the second preset voltage threshold. In this case, the power supply apparatus 200 supplies power to the electrical device.

For example, if a switch transistor in each circuit of the power supply apparatus 200 is a MOS transistor, the first controller may be connected to a gate of the MOS transistor, so that the power supply apparatus 200 can supply power to the electrical device by controlling on/off of the MOS transistor. If a switch transistor in each circuit of the power supply apparatus 200 is BJT, the controller may be connected to a base of the BJT, so that the power supply apparatus 200 can supply power to the electrical device by controlling on/off of the BJT.

In an embodiment, if the first controller may further be connected to the switcher, a switching circuit 201 is controlled to output the first voltage or the second voltage by controlling on/off of the switch transistor included in the switching circuit 201.

In an embodiment, the first controller may be any one of a micro controller unit MCU, a central processing unit CPU, or a digital signal processor DSP. Certainly, a specific form of the first controller is not limited to the foregoing example.

Figure 6:
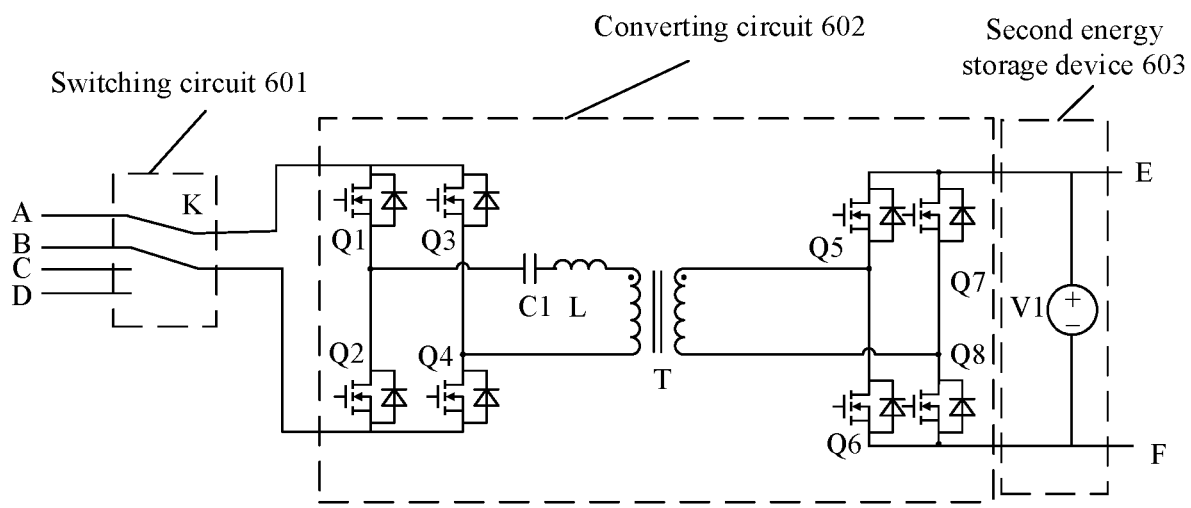
FIG. 6 is a schematic diagram 2 of a structure of a power supply apparatus according to an embodiment of this application.

With reference to the foregoing description, for example, an embodiment of this application provides a power supply apparatus, which may be shown in FIG. 6. The power supply apparatus 600 includes a switching circuit 601, a converting circuit 602, and a second energy storage device 603.

The switching circuit 601 includes a double-pole double-throw switch K. When the double-pole double-throw switch K is in a first position, a first terminal of K is connected to A, and a second terminal of K is connected to B; and when K is in a second position, the first terminal of K is connected to C, and the second terminal of K is connected to D. A is a first terminal point of an output terminal of a first power supply, B is a second terminal point of the output terminal of the first power supply, C is a first terminal point of an output terminal of a second power supply, and D is a second terminal point of the output terminal of the second power supply.

The converting circuit 602 includes an inductor L and switch transistors Q1, Q2, Q3, Q4, Q5, Q6, Q7, and Q8. A drain of Q1 is connected to the first terminal of K, and a source of Q2 is connected to the second terminal of K. A drain of Q7 may be connected to a positive wiring terminal of an electrical device, and a source of Q8 may be connected to a negative wiring terminal of the electrical device.

In the second energy storage device 603, the second energy storage device 603 includes a direct current storage battery V1. A positive wiring terminal of the direct current storage battery may be connected to the drain of Q7, and a negative wiring terminal of the direct current storage battery may be connected to the source of Q8.

Gates of the foregoing switch transistors are all connected to an external control circuit (or a second controller), and the control circuit implements a function of converting a first voltage or a second voltage received by the converting circuit 602 into a third voltage (a supply voltage of the electrical device) by controlling on/off of the switch transistors. The second controller may be disposed inside the converting circuit 602, or may be independent of the converting circuit 602. This is not described in detail herein in this application.

For example, the first power supply and the second power supply are connected to the switching circuit 601, and the switching circuit 601 is connected to the converting circuit 602. K is used as a first input terminal of the power supply apparatus 600 to receive the first voltage output by the first power supply or the second voltage output by the second power supply. The switching circuit 601 selects a voltage output by one of the two power supplies (the first power supply or the second power supply) and outputs the voltage to the converting circuit 602. The converting circuit 602 is configured to convert the voltage (the first voltage or the second voltage) output by the switching circuit 601 into the third voltage. Output terminals E and F of the converting circuit 602 are used as output terminals of the power supply apparatus 600, and are configured to be connected to the electrical device and output the third voltage to supply power to the electrical device.

In the power supply apparatus 600 provided above, in a process of supplying power to the electrical device, only one of the two power supplies supplies power to the electrical device, and the first voltage and the second voltage that are output by the two power supplies can be converted into the supply voltage of the electrical device by using one power supply apparatus 600. Therefore, when the two power supplies are used to supply power to the electrical device, only one power supply apparatus 600 is required to convert the voltages output by the two power supplies into the supply voltage of the electrical device, and supply power to the electrical device, thereby effectively reducing costs and a volume of the power supply apparatus 600.

For example, in a process in which the power supply apparatus 600 provided above is used to supply power to the electrical device, when the first power supply and the second power supply are normal, any one of the first power supply and the second power supply may be used as the power supply; when the first power supply or the second power supply is faulty, the other power supply may be switched to serve as the power supply; and when both the first power supply and the second power supply are faulty, in this case, the direct current stored in the second energy storage device 603 may be provided to the electrical device, to improve power supply reliability of the power supply apparatus 600. The second energy storage device 603 may be connected to a direct current power supply, and configured to: when the first power supply and the second power supply are faulty for a long time, ensure that the electrical device can work normally to improve power supply reliability.

Figure 7:
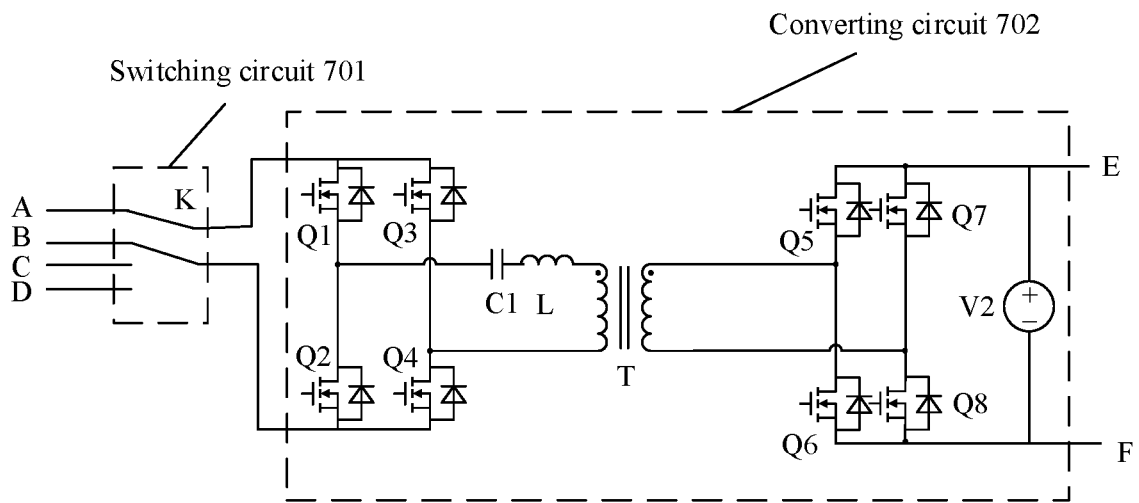
FIG. 7 is a schematic diagram 3 of a structure of a power supply apparatus according to an embodiment of this application.

With reference to the foregoing description, for example, an embodiment of this application provides another power supply apparatus, which may be shown in FIG. 7. The power supply apparatus 700 includes a switching circuit 701 and a converting circuit 702.

The switching circuit 701 includes a double-pole double-throw switch K. When the double-pole double-throw switch K is in a first position, a first terminal of K is connected to A, and a second terminal of K is connected to B; and when K is in a second position, the first terminal of K is connected to C, and the second terminal of K is connected to D. A is a first terminal point of an output terminal of a first power supply, B is a second terminal point of the output terminal of the first power supply, C is a first terminal point of an output terminal of a second power supply, and D is a second terminal point of the output terminal of the second power supply.

The converting circuit 702 includes an inductor L, switch transistors S1, S2, S3, and S4, and a first energy storage device V2. A drain of Q1 is connected to the first terminal of K, and a source of Q2 is connected to the second terminal of K. A drain of Q7 is connected to a positive wiring terminal of an electrical device, and a source of Q8 is connected to a negative wiring terminal of the electrical device. A positive wiring terminal of V2 is connected to the drain of Q7, and a negative wiring terminal of V2 is connected to the source of Q8.

Gates of the foregoing switch transistors are all connected to an external control circuit (or a first controller), and the control circuit implements a function of converting an alternating current received by the converting circuit 702 into a direct current by controlling on/off of the switch transistors. The first controller may be disposed inside the converting circuit 702, or may be independent of the converting circuit 702. This is not specifically limited herein in this application.

For example, the first power supply and the second power supply are connected to the switching circuit 701, and the switching circuit 701 is connected to the converting circuit 702. K is used as a first input terminal of the power supply apparatus 700 to receive a first voltage output by a first power supply or a second voltage output by a second power supply. The switching circuit 701 selects one of the two power supplies (the first power supply and the second power supply) and outputs the selected power supply to the converting circuit 702. The converting circuit 702 is configured to convert the received voltage (the first voltage or the second voltage) output by the switching circuit 701 into a third voltage. Output terminals E and F of the converting circuit 702 are used as output terminals of the power supply apparatus 700, and are configured to be connected to the electrical device and output the third voltage to supply power to the electrical device.

In the power supply apparatus 700 provided above, in a process of supplying power to the electrical device, only one of the two power supplies supplies power to the electrical device, and the first voltage and the second voltage that are output by the two power supplies can be converted into the supply voltage of the electrical device by using one power supply apparatus 700. Therefore, when the two power supplies are used to supply power to the electrical device, only one power supply apparatus 700 is required to convert the voltages output by the two power supplies into the supply voltage of the electrical device, and supply power to the electrical device, thereby effectively reducing costs and a volume of the power supply apparatus 700.

For example, in a process in which the power supply apparatus 700 provided above is used to supply power to the electrical device, when the first power supply and the second power supply are normal, any one of the first power supply and the second power supply may be used as the power supply; when the first power supply or the second power supply is faulty, the other power supply may be switched to serve as the power supply; and when both the first power supply and the second power supply are faulty, in this case, the direct current stored in the first energy storage device V2 may be provided to the electrical device, to improve power supply reliability of the power supply apparatus 700.

In conclusion, by using the power supply apparatus provided in this embodiment of this application, when power is supplied to the electrical device, a volume of the power supply apparatus may be reduced, and costs of the power supply apparatus may also be reduced.

Figure 8:
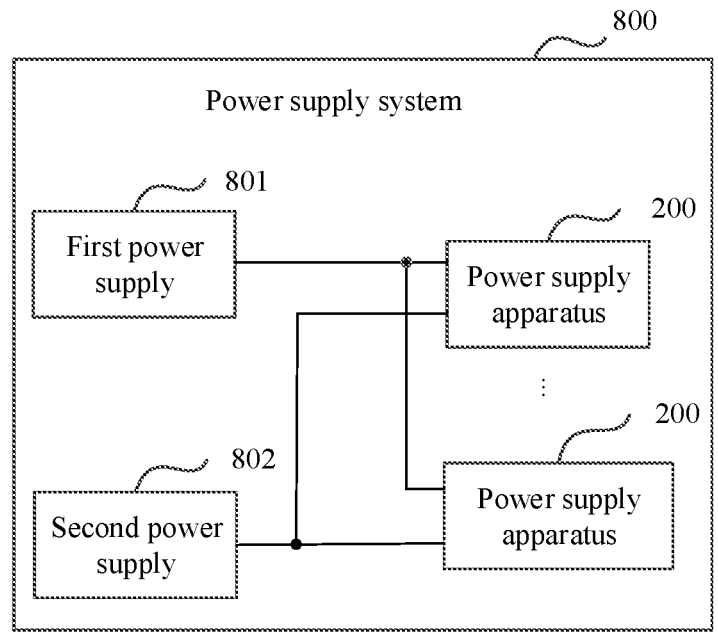
FIG. 8 is a schematic diagram of a structure of a power supply system according to an embodiment of this application.

An embodiment of this application further provides a power supply system. Refer to FIG. 8. The power supply system 800 may include a first power supply 801, a second power supply 802, and a plurality of the foregoing power supply apparatuses 200.

Optionally, the first power supply 801 is connected to a first input terminal of each of the plurality of power supply apparatuses 200, and the first power supply 801 is configured to supply power to the plurality of power supply apparatuses 200.

Optionally, the second power supply 802 is connected to a second input terminal of each of the plurality of power supply apparatuses 200, and the second power supply 802 is configured to supply power to the plurality of power supply apparatuses 200.

Optionally, the plurality of power supply apparatuses 200 are connected to a plurality of electrical devices in a one-to-one correspondence, and the plurality of power supply apparatuses 200 are configured to supply power to the plurality of electrical devices.

In an embodiment, the power supply system 800 is connected between two power supplies of a distributed data center system and the electrical device, and the power supply system 800 is configured to supply power to the electrical device by using a voltage output by the power supply.

Optionally, the power supply may include any one of the following: a mains supply, an electric generator, or a UPS.

In an embodiment, the power supply system 800 is connected between two power supplies and a server, and the power supply system 800 is configured to supply power to the server by using the voltage output by the power supply.

Obviously, a person skilled in the art can make various modifications and variations to this application without departing from the scope of the claims of this application. This application is intended to cover these modifications and variations of this application provided that they fall within the scope of protection defined by the following claims and their equivalent technologies.

What is claimed is:

1. A power supply apparatus, comprising:
a switching circuit, wherein the switching circuit comprises a switcher, a first input terminal, a second input terminal, and an output terminal, the first input terminal of the switching circuit is configured to receive a first voltage provided by a first power supply, the second input terminal of the switching circuit is configured to receive a second voltage provided by a second power supply, and the switcher is configured to control the output terminal of the switching circuit to be connected to the first input terminal or control the output terminal of the switching circuit to be connected to the second input terminal; and a converting circuit, wherein the converting circuit comprises an input terminal and an output terminal, the input terminal of the converting circuit is connected to the output terminal of the switching circuit, the output terminal of the converting circuit is connected to an electrical device, and the converting circuit is configured to receive the first voltage or the second voltage, convert the received first voltage or the received second voltage into a third voltage, and output the third voltage through the output terminal of the converting circuit, wherein the converting circuit comprises a converter;

an input terminal of the converter is the input terminal of the converting circuit, and an output terminal of the converter is the output terminal of the converting circuit; and based on the first voltage and the second voltage being direct current voltages, the converter is configured to: based on a voltage value of the received first voltage being greater than a first preset voltage threshold value or a voltage value of the received second voltage being greater than the first preset voltage threshold value, convert the first voltage or the second voltage into the third voltage, and output the third voltage through the output terminal of the converter; and based on the first voltage and the second voltage being alternating current voltages, the converter is configured to: based on a value of the received first voltage being greater than the first preset voltage threshold value or a value of the received second voltage being greater than the first preset voltage threshold value, convert the first voltage or the second voltage into the third voltage, and output the third voltage through the output terminal of the converter.

2. The power supply apparatus according to claim 1, wherein the switcher comprises a power semiconductor device or a mechanical switching device.

3. A power supply system, comprising a first power supply, a second power supply, and a plurality of the power supply apparatuses according to claim 1, wherein
the first power supply is connected to a first input terminal of each of the plurality of power supply apparatuses, and the first power supply is configured to supply power to the plurality of power supply apparatuses;
the second power supply is connected to a second input terminal of each of the plurality of power supply apparatuses, and the second power supply is configured to supply power to the plurality of power supply apparatuses; and
the plurality of power supply apparatuses are connected to a plurality of electrical devices in a one-to-one correspondence, and the plurality of power supply apparatuses are configured to supply power to the plurality of electrical devices.

4. A power supply apparatus, comprising:
a switching circuit, wherein the switching circuit comprises a switcher, a first input terminal, a second input terminal, and an output terminal, the first input terminal of the switching circuit is configured to receive a first voltage provided by a first power supply, the second input terminal of the switching circuit is configured to receive a second voltage provided by a second power supply, and the switcher is configured to control the output terminal of the switching circuit to be connected to the first input terminal or control the output terminal of the switching circuit to be connected to the second input terminal; and a converting circuit, wherein the converting circuit comprises an input terminal and an output terminal, the input terminal of the converting circuit is connected to the output terminal of the switching circuit, the output terminal of the converting circuit is connected to an electrical device, and the converting circuit is configured to receive the first voltage or the second voltage, convert the received first voltage or the received second voltage into a third voltage, and output the third voltage through the output terminal of the converting circuit, wherein the converting circuit comprises a converter;

an input terminal of the converter is the input terminal of the converting circuit, and an output terminal of the converter is the output terminal of the converting circuit; and based on the first voltage and the second voltage being direct current voltages, the converter is configured to: based on a voltage value of the received first voltage being greater than a first preset voltage threshold value or a voltage value of the received second voltage being greater than the first preset voltage threshold value, convert the first voltage or the second voltage into the third voltage, and output the third voltage through the output terminal of the converter, wherein the converting circuit further comprises a first energy storage device;

the first energy storage device is connected to the output terminal of the converter; and the first energy storage device is configured to store a part of the third voltage output by the converter based on a voltage value of the third voltage being greater than a second preset voltage threshold value, and output the stored voltage through the output terminal of the converter based on a voltage value of the third voltage being less than or equal to the second preset voltage threshold value.

5. The power supply apparatus according to claim 4, wherein the converting circuit further comprises a first controller, and the first controller is configured to: control the converter to convert the first voltage or the second voltage into the third voltage, and control the first energy storage device to output the stored voltage through the output terminal of the converter based on the voltage value of the third voltage being less than or equal to the second preset voltage threshold value.

6. The power supply apparatus according to claim 4, wherein the first energy storage device comprises any one of the following: a lead carbon battery, a lithium iron phosphate battery, a ternary lithium battery, a sodium sulfur battery, a graphene battery, a capacitor, or a flow battery.

7. The power supply apparatus according to claim 4, wherein the switcher comprises a power semiconductor device or a mechanical switching device.

8. A power supply system, comprising a first power supply, a second power supply, and a plurality of the power supply apparatuses according to claim 4, wherein
the first power supply is connected to a first input terminal of each of the plurality of power supply apparatuses, and the first power supply is configured to supply power to the plurality of power supply apparatuses;
the second power supply is connected to a second input terminal of each of the plurality of power supply apparatuses, and the second power supply is configured to supply power to the plurality of power supply apparatuses; and
the plurality of power supply apparatuses are connected to a plurality of electrical devices in a one-to-one correspondence, and the plurality of power supply apparatuses are configured to supply power to the plurality of electrical devices.

9. A power supply apparatus, comprising:
a switching circuit, wherein the switching circuit comprises a switcher, a first input terminal, a second input terminal, and an output terminal, the first input terminal of the switching circuit is configured to receive a first voltage provided by a first power supply, the second input terminal of the switching circuit is configured to receive a second voltage provided by a second power supply, and the switcher is configured to control the output terminal of the switching circuit to be connected to the first input terminal or control the output terminal of the switching circuit to be connected to the second input terminal; and a converting circuit, wherein the converting circuit comprises an input terminal and an output terminal, the input terminal of the converting circuit is connected to the output terminal of the switching circuit, the output terminal of the converting circuit is connected to an electrical device, and the converting circuit is configured to receive the first voltage or the second voltage, convert the received first voltage or the received second voltage into a third voltage, and output the third voltage through the output terminal of the converting circuit, wherein the converting circuit comprises a converter;

an input terminal of the converter is the input terminal of the converting circuit, and an output terminal of the converter is the output terminal of the converting circuit; and based on the first voltage and the second voltage being direct current voltages, the converter is configured to: based on a voltage value of the received first voltage being greater than a first preset voltage threshold value or a voltage value of the received second voltage being greater than the first preset voltage threshold value, convert the first voltage or the second voltage into the third voltage, and output the third voltage through the output terminal of the converter, wherein the power supply apparatus further comprises a second energy storage device independent of the converting circuit;

the second energy storage device is connected to the output terminal of the converting circuit; and the second energy storage device is configured to store a part of the third voltage output by the converter based on a voltage value of the third voltage being greater than a third preset voltage threshold value, and output the stored voltage through the output terminal of the converter based on a voltage value of the third voltage being less than or equal to the third preset voltage threshold value.

10. The power supply apparatus according to claim 9, wherein the power supply apparatus further comprises a second controller, and the second controller is configured to: control the converter to convert the first voltage or the second voltage into the third voltage, and control the second energy storage device to output the stored voltage through the output terminal of the converter based on the voltage value of the third voltage being less than or equal to the third preset voltage threshold value.

11. The power supply apparatus according to claim 9, wherein the second energy storage device comprises any one of the following: a lead carbon battery, a lithium iron phosphate battery, a ternary lithium battery, a sodium sulfur battery, a graphene battery, a capacitor, or a flow battery.

12. The power supply apparatus according to claim 9, wherein the switcher comprises a power semiconductor device or a mechanical switching device.

13. A power supply system, comprising a first power supply, a second power supply, and a plurality of the power supply apparatuses according to claim 9, wherein
- the first power supply is connected to a first input terminal of each of the plurality of power supply apparatuses, and the first power supply is configured to supply power to the plurality of power supply apparatuses;
- the second power supply is connected to a second input terminal of each of the plurality of power supply apparatuses, and the second power supply is configured to supply power to the plurality of power supply apparatuses; and
- the plurality of power supply apparatuses are connected to a plurality of electrical devices in a one-to-one correspondence, and the plurality of power supply apparatuses are configured to supply power to the plurality of electrical devices.

* * * * *